United States Patent [19]

Teramachi

[11] Patent Number: 4,659,239
[45] Date of Patent: Apr. 21, 1987

[54] BEARING FOR AXIAL LINEAR MOTION

[76] Inventor: Hiroshi Teramachi, 2-34-8, Higashi-Tamagawa, Setagaya-Ku, Tokyo, Japan

[21] Appl. No.: 857,153

[22] Filed: Apr. 29, 1986

[30] Foreign Application Priority Data

Apr. 30, 1985 [JP] Japan ............................. 60-63183[U]

[51] Int. Cl.$^4$ ............................................. F16C 29/06
[52] U.S. Cl. ....................................................... 384/45
[58] Field of Search ...................... 384/45, 43, 44, 168

[56] References Cited

U.S. PATENT DOCUMENTS

| 4,328,999 | 5/1982 | Olschewski et al. | 464/168 |
| 4,406,502 | 9/1983 | Teramachi | 384/45 |
| 4,572,591 | 2/1986 | Walter et al. | 384/45 |
| 4,582,370 | 4/1986 | Ogawa | 384/45 |

Primary Examiner—Lenard A. Footland
Attorney, Agent, or Firm—Kenyon & Kenyon

[57] ABSTRACT

A bearing for axial linear motion such as a ball spline bearing has an outer cylinder, a ball retainer and end covers. The outer cylinder has a plurality of loaded ball guide grooves and a plurality of non-loaded ball guide grooves formed on the inner peripheral surface thereof such that the loaded ball guide grooves and the non-loaded ball guide grooves are alternatingly formed in the circumferential direction. The ball retainer, which is made of a plastic, has an axial length greater than that of the outer cylinder and is provided on the outer peripheral surface thereof with a plurality of endless track grooves which cooperate with the loaded and non-loaded ball guide grooves of the said outer cylinder so as to permit respective trains of a multiplicity of rolling balls to be recirculated therethrough. The pair of end covers, which also are made of a plastic, are fitted and welded to both axial end portions of the ball retainer projecting beyond both ends of the outer cylinder, each of the end cover being provided on the inner surface thereof with ball-turning grooves which radially confront the ball-turning grooves of the endless track grooves in the ball retainer so as to define circular ball-turning passages through which the rolling balls run from the loaded regions to the non-loaded regions of the endless track grooves and vice versa.

3 Claims, 17 Drawing Figures

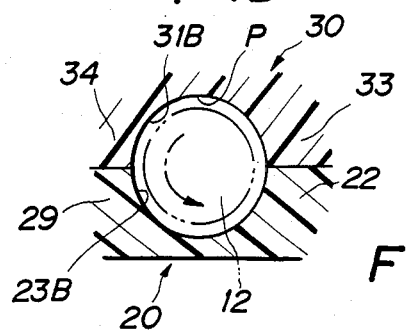
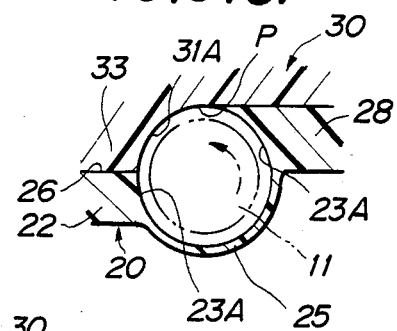
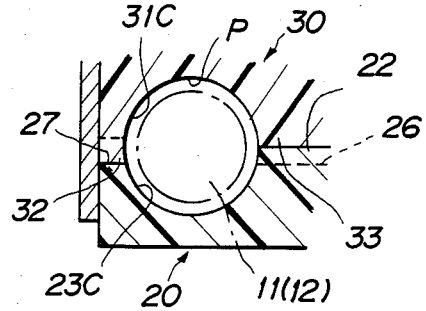
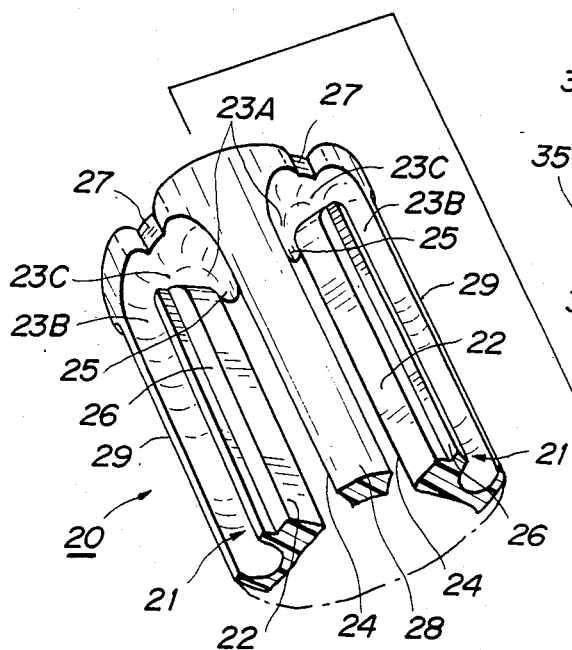
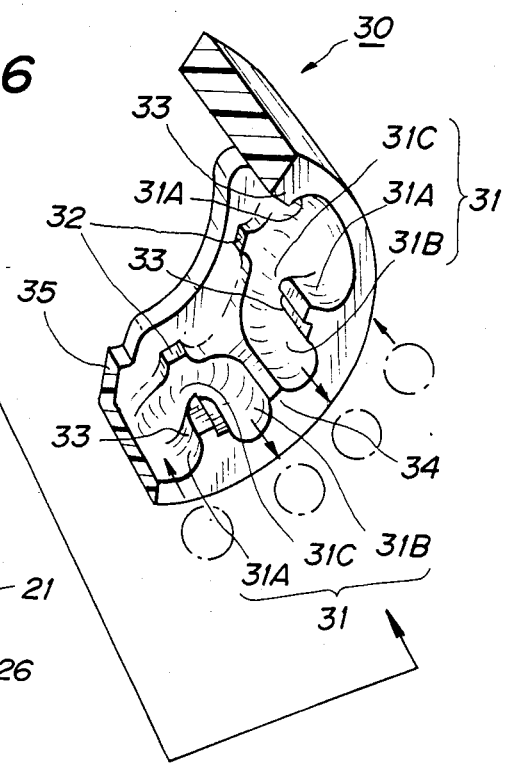

BEARING FOR AXIAL LINEAR MOTION

BACKGROUND OF THE INVENTION

1. Field of the Invention

The present invention relates to a bearing for axial linear motion for allowing relative linear movement between a shaft and an outer cylinder surrounding the shaft, through the intermediary of a multiplicity of balls which minimize the resistance to the movement by virtue of the rolling friction, so as to enable the linear movement with reduced force. The term "bearing" in this specification is used to cover both ball spline bearings which permit reciprocatory relative axial movement while enabling transmission of torque and linear motion bearings which permit relative axial movement but is not designed any torque transmission.

2. Description of the Prior Art

A typical conventional bearing for axial linear motion has an outer cylinder provided on the inner peripheral surface thereof with a plurality of loaded ball guide grooves and non-loaded ball guide grooves each having a substantially U-shaped cross section, the two types of grooves appearing alternatingly on the circumferential direction. The outer cylinder is further provided on the inner peripheral surface thereof with circumferential grooves disposed at both axial ends of the guide grooves, in such a manner that each circumferential grooves interconnect each loaded-ball guide grooves with the associated non-loaded ball guide grooves.

The outer cylinder receives a ball retainer which has a plurality of endless ball grooves each of which corresponds to each pair of loaded and non-loaded ball guide grooves, so that a multiplicity of balls which are held between the outer cylinder and the retainer are circulated through each endless ball passage which is constituted by cooperation between the endless ball groove in the ball retainer and the loaded and non-loaded ball guide grooves in the outer cylinder connected through the circular ball grooves. The ball retainer is rigidly fixed to the outer cylinder by means of stop rings which are fitted in both axial ends of the outer cylinder.

As to further detail of the bearing of this type, a reference shall be made to Japanese Patent Publication Nos. 22210/1978 and 33702/1978.

This known bearing has a drawback in that, since the outer cylinder has to have not only the loaded and non-loaded ball guide grooves, but also the circumferential grooves and the engaging grooves for retaining the stop rings, the overall length of the outer cylinder is increased with a result that the weight and cost of the bearing are increased. Such a heavy bearing is not suitable for use in various machines and instruments.

In addition, it is generally difficult and time consuming to form on the inner peripheral surface of the outer cylinder both the axially extending loaded and non-loaded ball guide grooves and circumferential grooves which are substantially perpendicular to the ball guide grooves. This causes an impediment to the mass production of the bearing of the type described.

Another problem is that the stop rings are indispensable for fixing the retainer, to the outer cylinder. This in turn requires provision of suitable dust seals such as of a rubber, in order to prevent dusts and other foreign matters from coming into the bearing through a clearance around the stop ring. The necessity for the stop rings and dust seals increases the number of steps in the assembly process.

In order to obviate these drawbacks and problems of the prior art, another bearing has been proposed in which the axial length of the outer cylinder is reduced by omitting the circumferential grooves. In this case, a pair of end covers are attached to both axial ends of the outer cylinder. The end covers are provided with ball turning grooves each cooperate with corresponding portion of the associated endless ball groove in the retainer so as to permit the balls to move from the non-loaded ball grooves into the loaded ball grooves and vice versa.

This type of bearing is disclosed, for example, in Japanese Patent Laid-Open Nos. 155922/1980, 159320/1980 and 159321/1980, as well as in Japanese Patent Publication No. 50969/1982.

The end cover of this type of bearing is formed from an alloy by diecasting, and is rigidly secured to the outer cylinder by means of fixing members such as small screws. The retainer also is made of a metallic material having outer configuration and size substantially conforming with the inner configuration and size of the outer cylinder. The fabrication of the outer cylinder and also of the retainer is difficult and the production cost inevitably rises due to such a difficulty.

In order to obviate this problem, it has been proposed to use the retainer and the end covers as plastic materials, and to integrally weld the end covers to both axial ends of the retainer, as disclosed in Japanese Patent Laid-Open Nos. 76547/1977, 54638/1978 and 115622/1980.

In this proposed bearing, however, the end cover has a flat inner peripheral surface and, therefore, the end cover does not have any function for positively guiding the balls along a constant track when the balls are being turned. In consequence, during high speed movement of the bearing, the balls tend to be urged radially outwardly in such a manner as to float up from the retainer, and the balls become free both from the retainer and the end cover. In other words, the balls are not restrained neither in the axial direction nor radial direction when being turned at each axial end of the ball passage, so that they cannot move along a constant orbital path at each axial end of the endless passage. This undesirably impedes the smooth turning of the balls and causes high level of noise due to mechanical interference between the balls.

SUMMARY OF THE INVENTION

Accordingly, an object of the present invention is to provide a bearing which is improved in such a manner as to enable a reduction in the weight and to facilitate the fabrication and assembly, so as to reduce the production cost, thereby overcoming the above-described problems of the prior art.

Another object of the present invention is to provide a bearing in which a substantially circular ball turning passages for positively guiding the balls along the constant track are defined by both axial end portions of a ball retainer and a pair of end covers which are fixed to these axial end portions of the ball retainer, so that the balls can smoothly turn along the circular ball-turning passages, thus obviating the above-described problems.

To these ends, according to the present invention, there is provided a bearing for axial linear motion comprising: a substantially cylindrical outer cylinder having a plurality of loaded ball guide grooves and a plurality of non-loaded ball guide grooves formed on the inner peripheral surface thereof such that the loaded ball guide grooves and the non-loaded ball guide grooves are alternatingly formed in the circumferential direction; a substantially cylindrical ball retainer received in said outer case and having an axial length greater than that of the outer cylinder and provided on the outer peripheral surface thereof with a plurality of endless track grooves which cooperate with the loaded and non-loaded ball guide grooves of the said outer cylinder so as to permit respective trains of a multiplicity of balls to be recirculated therethrough; and a pair of substantially ring-shaped end covers fitted and welded to both axial end portions of the ball retainer projecting beyond both ends of the outer cylinder, each of the end cover being provided on the inner surface thereof with circular ball-turning grooves which radially confront the ball-turning grooves of the endless track grooves in the ball retainer so as to define circular ball-turning passages through which the balls are moved from the loaded regions to the non-loaded regions of the endless track grooves and vice versa.

Thus, according to the bearing of the present invention, the ball retainer having the endless track grooves is received in the outer cylinder having the corresponding ball guide grooves through the intermediary of a plurality of balls, and the pair of end covers are welded to each axial end portion of the ball retainer projecting beyond the outer cylinder. Each end cover and the corresponding both ends of the ball retainer in cooperation with each end cover define circular ball-turning passages which can positively guide respective trains of balls along a constant track when the balls turn. Thus, when the bearing is moved in the direction of the axis of a shaft on which the bearing is mounted, the balls in the form of trains are smoothly guided and turn through the circular ball-turning passages from the loaded region between the shaft and the outer cylinder into the non-loaded region between the ball retainer and the outer cylinder and vice versa. Each circular ball-turning passages are constituted by the ball-turning grooves formed on the inner peripheral surface of each end cover and the corresponding ball-turning grooves formed on the outer peripheral surface of the ball retainer. Preferably, the both ball-turning grooves of the ball retainer and the end cover defining the circular ball-turning passages are shaped and sized such that these ball-turning grooves in cooperation completely enclose the balls.

These and other objects, features and advantages of the present invention will become clear from the following description of the preferred embodiment when the same is read in conjunction with the accompanying drawings.

BRIEF DESCRIPTION OF THE DRAWINGS

FIG. 5C is a sectional view of an essential portion of the circular ball passage, showing particularly a loaded region thereof;

FIG. 5D is a sectional view of an essential portion of the circular ball passage, showing particularly a non-loaded region thereof;

FIG. 5E is a sectional view of an essential portion of the circular ball passage, showing particularly a transient region between the loaded region and the non-loaded region;

FIG. 6 is a fragmentary perspective view of an essential portion of an end cover which is adapted to fit on each axial end portion of the retainer projecting beyond the outer cylinder;

DESCRIPTION OF THE PREFERRED EMBODIMENT

Figure 1:
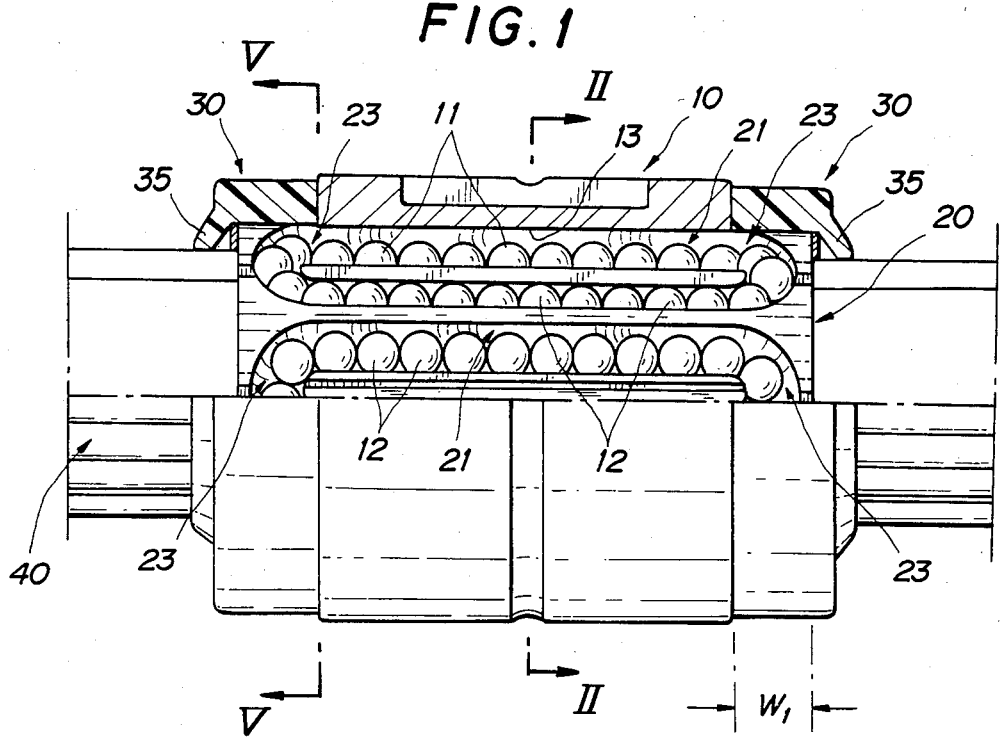
FIG. 1 is a partly-sectioned side-elevational view of a ball spline bearing as an embodiment of the bearing for axial linear motion in accordance with the invention.
Figure 2:
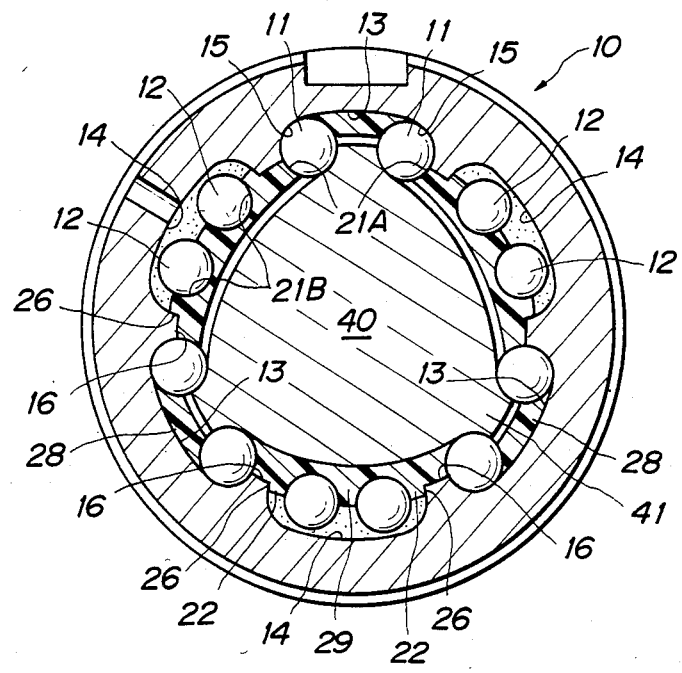
FIG. 2 is a cross-sectional view taken along the line II—II of FIG. 1.
Figure 3:
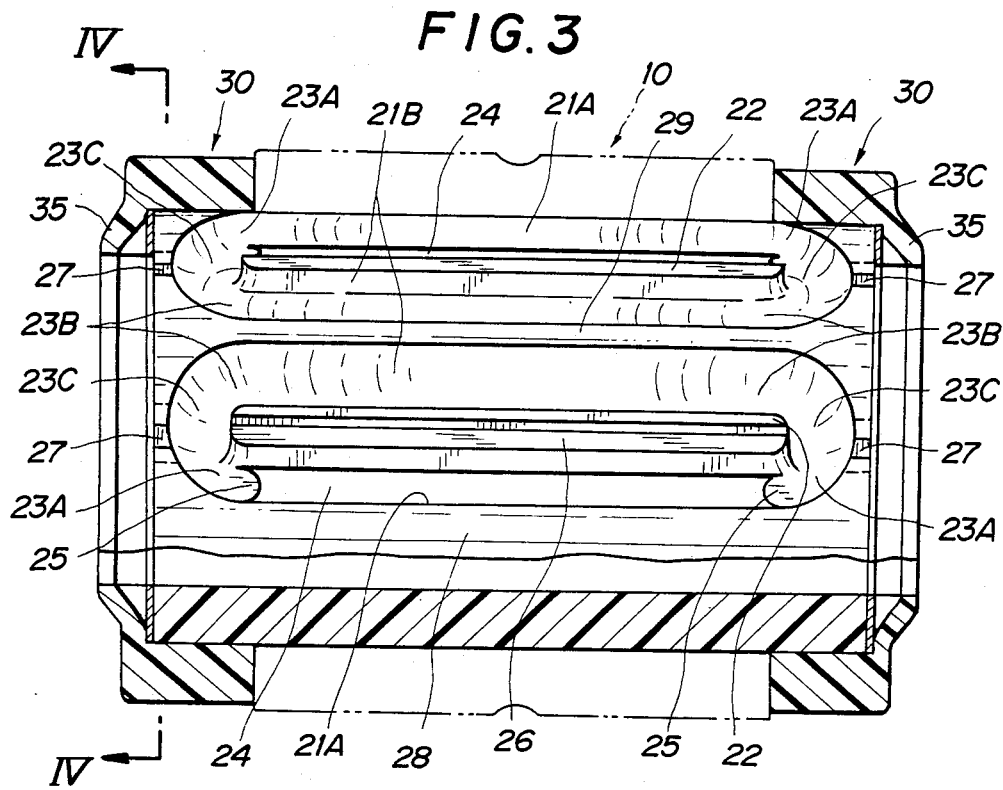
FIG. 3 is a sectional side elevational view of the bearing shown in FIG. 1 in the state after demounting from a spline shaft.

A preferred embodiment of the present invention will be described hereinunder with reference to the FIGS. 1 to 13 which show a ball spline bearing as a preferred embodiment of the bearing for axial linear motion in accordance with the present invention.

Referring to these Figures, the ball spline bearing has an outer cylinder generally designated at a reference numeral 10. As will be best seen from FIGS. 7 and 8, the outer cylinder is a cylindrical member which is formed by cutting a thick-walled cylindrical pipe in a predetermined axial length or, alternatively by boring a cylindrical solid stock so as to form a central axial bore. The outer cylinder is provided on the inner peripheral surface thereof with a plurality of loaded ball guide grooves 13 and non-loaded ball guide grooves 14 adapted to guide loaded ball trains 11 and non-loaded ball trains 12. Each of these grooves have a substantially U-shaped cross section and are formed by broaching or slotting. The loaded ball guide grooves 13 and the non-loaded ball guide grooves 14 are formed such that they appear alternatingly in the circumferential direction and that they extend in the axial direction of the outer cylinder over the entire length of the latter. Loaded ball rolling surfaces 15, 15, each having a radius of curvature slightly greater than that of the ball, are formed on both circumferential ends of each loaded ball guide grooves 13, by ball burnishing or slotting. The radial distance between the center of the outer cylinder 10 and the bottom of the non-loaded ball guide groove 14 is equal to or slightly greater than the radial distance between the center of the outer cylinder 10 and the bottom of the loaded ball guide groove 13. That is to say, the non-loaded ball guide grooves 14 has a depth equal to or slightly greater than that of the loaded ball guide grooves 13. The outer cylinder 10 further has a plurality of axial ridges 16 protruding radially inwardly from the inner peripheral surface thereof. The axial ridges 16 are formed at a constant circumferential pitch so as to separate the loaded ball guide grooves 13 and the non-loaded ball guide grooves 14 and are extended in the axial direction of the outer cylinder 10 over the entire length of the latter.

The axial linear motion bearing further has a substantially cylindrical and integral ball retainer 20 which is made of a plastic. The ball retainer 20 is provided on the outer peripheral surface thereof with a plurality of endless ball track grooves 21 which, in cooperation with the loaded ball guide grooves 13 and the non-loaded ball guide grooves 14, allow the balls to be recirculated therethrough.

More specifically, the endless track grooves 21 are defined by substantially ellipse recesses formed on the outer peripheral surface of the ball retainer 20 at a regular circumferential pitch. An axial ridge 22 is formed on the outer peripheral surface of the ball retainer 20 at the breadthwise mid portion of the said ellipse recess, such that the endless track groove 21 are formed around the side of the axial ridge 22 in the ellipse recess. The endless track groove 21 has a substantially constant semicircular cross section over its entire length. The cross section of the endless track groove 21 has a radius of curvature which is slightly greater than the radius of the ball and a depth which is about a half that of the ball diameter. Each axial end of the endless track groove 21, curved in a U-like form, constitutes a ball-turning section or a ball-turning groove 23. The straight run 21A of endless track grooves 21, corresponding to the loaded ball rolling surfaces 15, 15 formed on the inner peripheral surface of the outer cylinder 10, is cut in such a manner as to form axial slits 24 having a width smaller than the diameter of the ball. Tongue 25 for picking up the balls into the ball-turning groove 23 is formed on the bottom of the straight run 21A at each end of the slit 24. The other straight run 21B of the each endless track groove 21 has a complete bottom, i.e., devoid of the slit. The straight run 21A of the endless track groove 21, along which the loaded balls run, will be referred to as "loaded ball-running groove 21A", while the straight run 21B along which the non-loaded balls run will be referred to as "non-loaded ball-running groove 21B". The U-shaped ball-turning groove 23 on each axial end of the endless track groove 21 is constituted by a loaded ball-turning groove 23A connected to the loaded ball-running groove 21A, a non-loaded ball-turning groove 23B connected to the non-loaded ball-running groove 21B and a curved intermediate groove 23C which interconnects loaded and non-loaded ball-turning grooves 23A, 23B.

The ridge 22 in each endless track groove 21 is provided on one side thereof with a step 26 over the entire length thereof. The step 26 is adapted to engage with the corresponding ridge 16 on the inner peripheral surface of the outer cylinder 10, so as to prevent the ball retainer 20 from rotating relatively to the outer cylinder 10. As a result, the loaded ball-running grooves 21A in the endless track grooves 21 correspond to the loaded ball guide grooves 13 in the radial direction of the outer cylinder 10, while the non-loaded ball-running grooves 21B in the endless track grooves 21 correspond to the non-loaded ball guide grooves 14 of the outer cylinder 10 in the radial direction, as will be seen from FIG. 2.

A plurality of fitting recesses 27, recessed radially inwardly from the outer peripheral surface of the ball retainer, are formed on each axial end of the ball retainer 20 at a constant circumferential pitch. As will be explained latter in reference to FIG. 4, these fitting recesses 27 are adapted to engage with guide projections formed in an end cover 30.

A reference numeral 28 denotes a partition wall which separates each slit 24 of two adjacent endless tracks grooves 21 in the ball retainer 20. The partition wall 28 is adapted to be received in the loaded ball guide groove 13 of the outer cylinder 10. Similarly, another partition wall denoted by a numeral 29 separates each non-loaded ball-running groove 21B of two adjacent endless track grooves 21. This partition wall 29 is adapted to be received in the non-loaded ball guide groove 14 of the outer cylinder 10.

The axial linear motion bearing further has a pair of end covers 30, 30 which are adapted to be fitted onto both axial end portions of the ball retainer 20 which project beyond both axial ends of the outer cylinder 10 and fixed to the outer peripheral surfaces of these axial end portions of the ball retainer 20 by welding. Each end cover 30 are made of the same plastic material as the ball retainer 20 and has a circular cross-section when taken in a plane perpendicular to the axis thereof. The axial thickness of the end cover 30 is greater than projection width "W1" of the axial end portion of the ball retainer 20.

Each end cover 30 are provided with a plurality of ball-turning grooves 31 formed on the inner peripheral surface thereof. More specifically, a plurality of guide projections 32 are formed on the axially outer end portion of the inner peripheral surface of the end cover 30 so as to protrude radially inwardly therefrom at a constant circumferential pitch. On the inner peripheral surface of each end cover 30 also are formed a plurality of axially extending ridges 33 in axial alignment with respective guide projections 32 such that a space large enough to permit the ball to pass therethrough is formed between the guide projection 32 and the corresponding end of the axially extending ridge 33. Thus, the number of the axially extending ridges 33 is the same as that of the guide projections 32. In the illustrated embodiment, there are six guide projections 32 and six axially extending ridges 33.

The arrangement is such that a loaded ball-turning groove 31A having a substantially U-shaped cross-section is provided between a pair of the axially extending ridges 33, i.e., between one of the ridges 33 and the adjacent another ridge 33. Whereas, a pair of non-loaded ball-turning grooves 31B which is separated from each other by another axially extending partition wall 34 is provided between another pair of axially extending ridges 33 which are different from the pair of ridges 33 for forming the loaded ball-turning groove 31A, whereby the loaded ball-turning groove 31A and the pair of non-loaded ball-turning groove 31B are formed alternatingly in the circumferential direction on the inner peripheral surface of the end cover 30. The partition wall 34, which is formed to protrude radially outwardly from the bottom of a U-cross sectioned groove, is provided with curved both side surfaces which extend to the axially outer end portion of the end cover 30 so as to smoothly merge in the curved inner surface of each guide projection 32. The axial opposite surface of each ridge 33, which axially opposes to the guide projection 32, is curved at the same curvature as curved both side surfaces thereof. Consequently, an intermediate connection groove 31C, which interconnects each loaded ball-turning groove 31A and the associated non-loaded ball-turning groove 31B, is formed between the opposing end surfaces of the guide projection 32 and the corresponding ridge 33.

It will be seen that a plurality of ball-turning grooves 31, six grooves in the illustrated embodiment, are formed in the inner peripheral surface of each end cover 30, at a regular circumferential interval, so as to smoothly guide respective trains of balls which are being turned. These ball-turning grooves 31 correspond to the opposing ball-turning grooves 23 of the ball retainer 20 in the radial direction. The ball-turning groove 31 has a curved surface which has a radius of curvature slightly greater than that of the ball and a depth which is about half the diameter of the ball, as is the case of the ball-turning groove 23 formed in the ball retainer 20. Consequently, when the end cover 30 is fitted on each axial end portion of the ball retainer 20, the loaded ball-turning grooves 23A and the non-loaded ball-turning grooves 23B of the endless track grooves 21 in the ball retainer 20 are aligned with the loaded ball-turning grooves 31A and non-loaded ball-turning grooves 31B of the ball-turning grooves 31 in the end cover 30, whereby circular-cross-sectioned ball turning passages A, each having a semi-circular form, are defined between the ball retainer 20 and the end cover 30.

Figure 4:
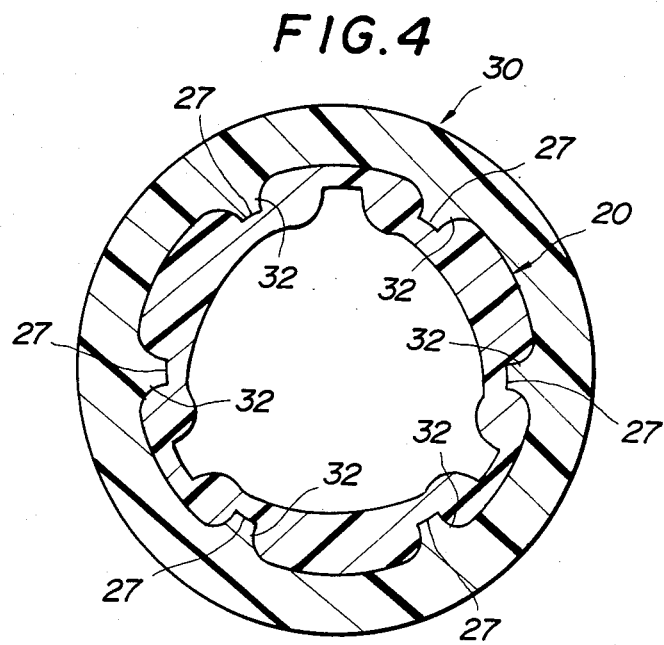
FIG. 4 is a cross-sectional view taken along the line IV—IV of FIG. 3.

As will be seen from FIGS. 4 and 6, the guide projections 32 formed on the inner peripheral surface of the end cover 30 engage with the fitting recesses 27 formed on the outer peripheral surface of the ball retainer 20, thereby locating the end cover 30 in the circumferential direction with respect to the ball retainer 20. The guide projections 32, which are located on the outer side of respective intermediate connecting grooves 31C, serve also to reinforce the ends of the respective ball turning grooves 31 in the end cover 30.

A reference numeral 35 designates dust covers which are formed on the inner peripheral surface of the end covers 30, 30 at the ends of these end covers remote from the outer cylinder 10. In order to permit the insertion of the spline shaft 40, each of the dust cover 35 have a central hole 36 which is configured in conformity with the outer configuration of the spline shaft 40.

Figure 5A:
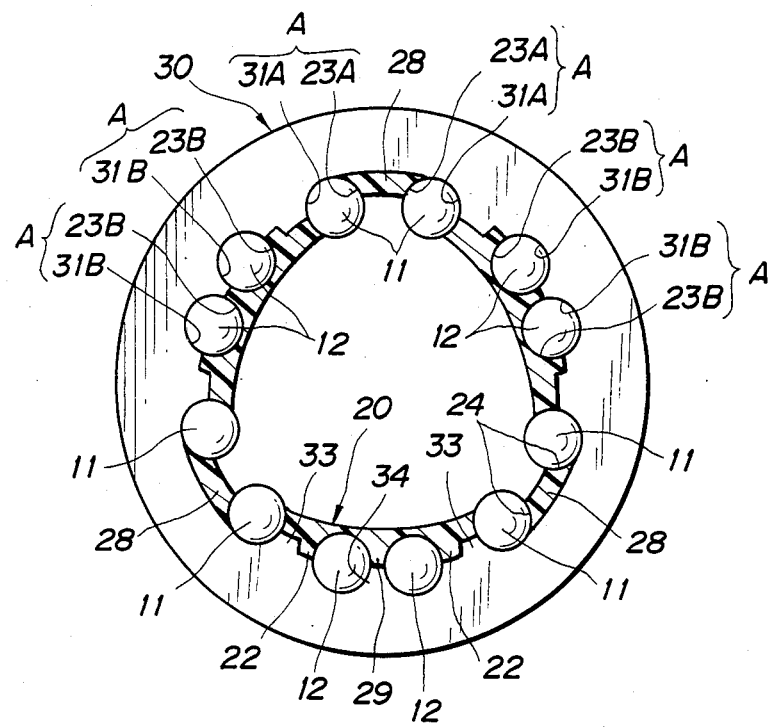
FIG. 5A is a cross-sectional view taken along the line IV—IV of FIG. 1.
Figure 5B:
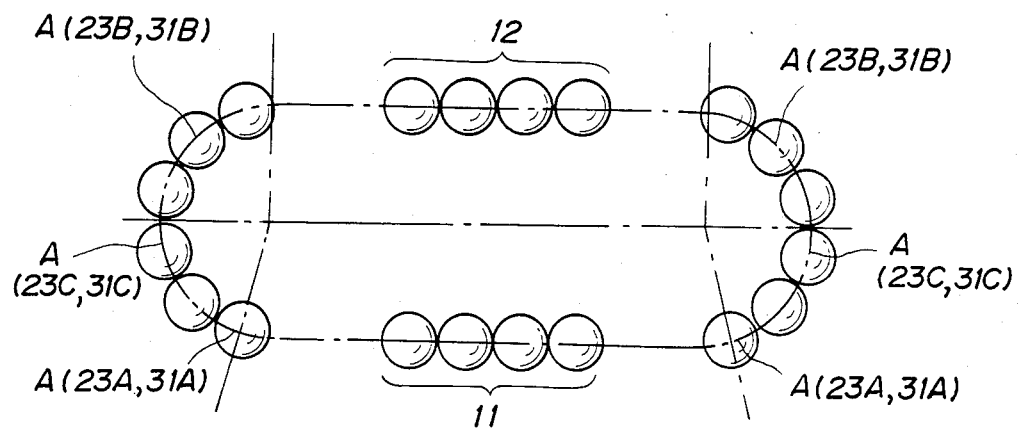
FIG. 5B is an illustration of a circular ball passage constituted by a ball turning groove formed in a retainer and a ball turning groove formed in an end cover.
Figure 7:
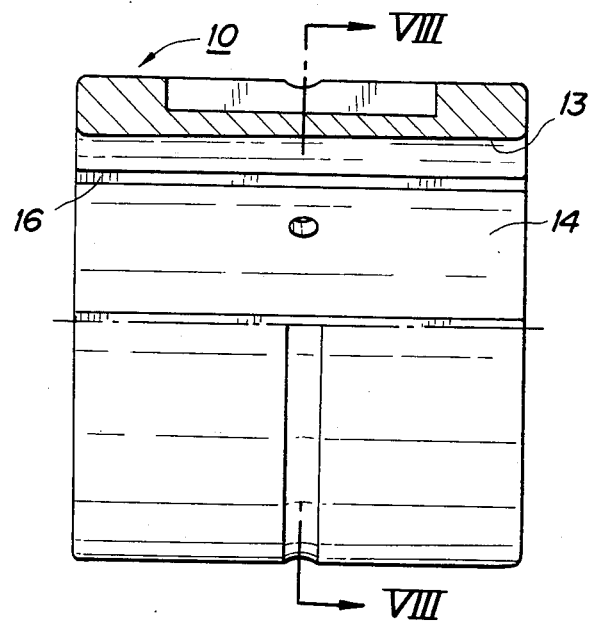
FIG. 7 is a partly-sectioned side elevational view of the outer cylinder.
Figure 8:
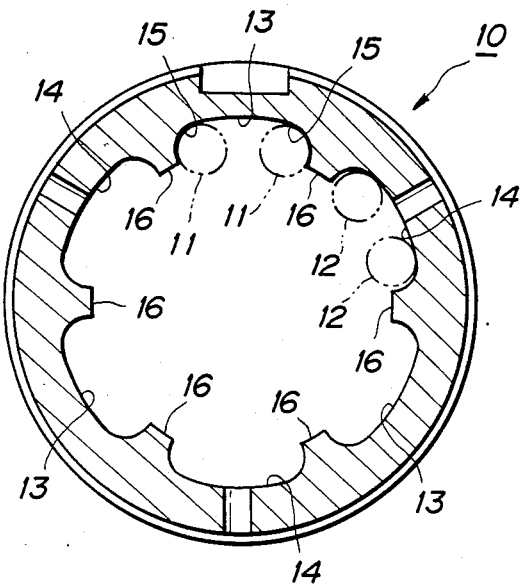
FIG. 8 is a cross-sectional view taken along the line VIII—VIII of FIG. 7.
Figure 9:
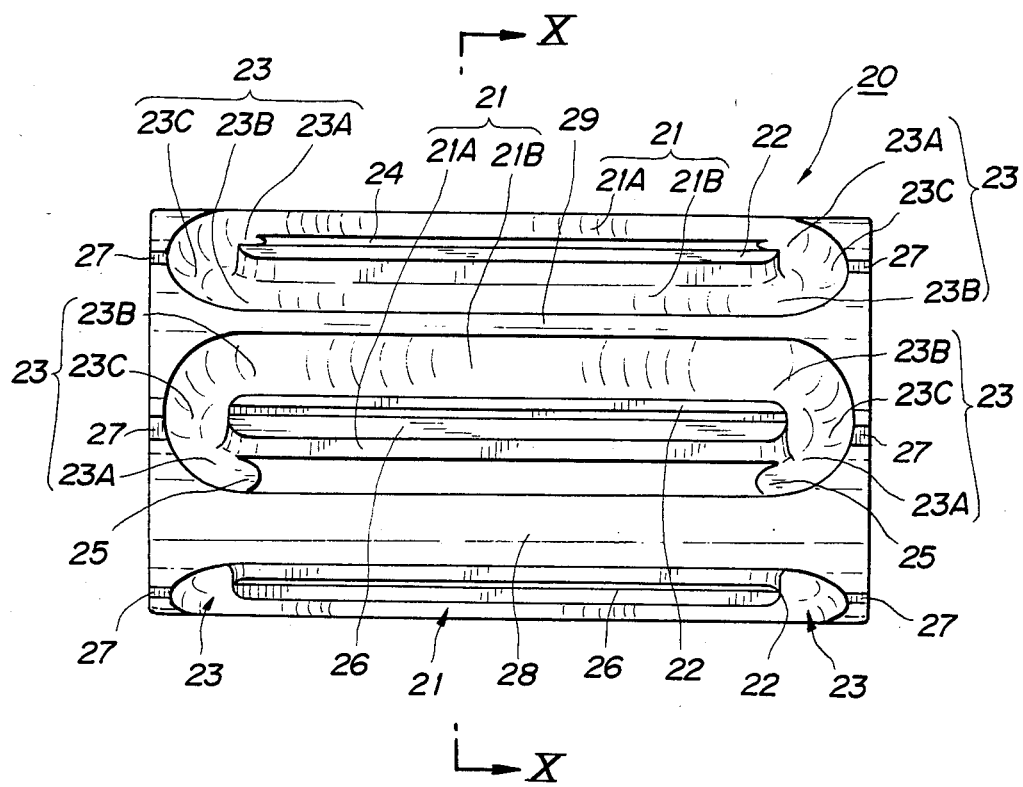
FIG. 9 is a front elevational view of a retainer.
Figure 10:
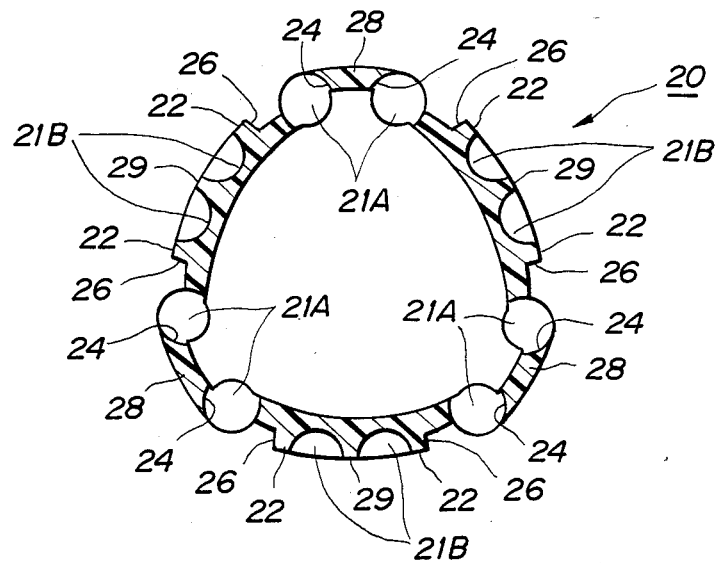
FIG. 10 is a cross-sectional view taken along the line X—X of FIG. 9.
Figure 11:
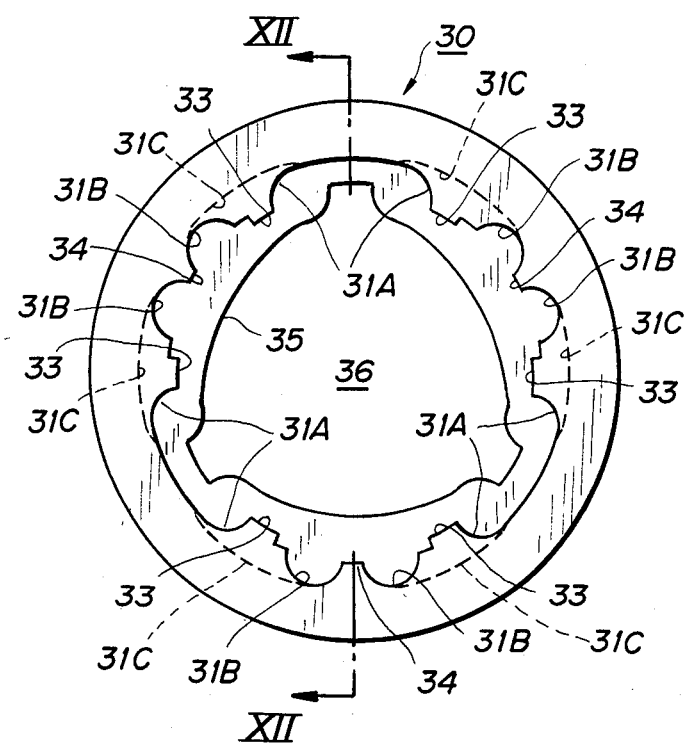
FIG. 11 is an end view of the end cover as viewed from right side in FIG. 1.
Figure 12:
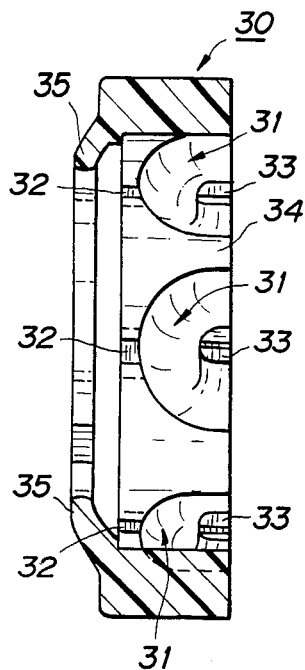
FIG. 12 is a sectional side elevational view taken along the line XII—XII of FIG. 11.
Figure 13:
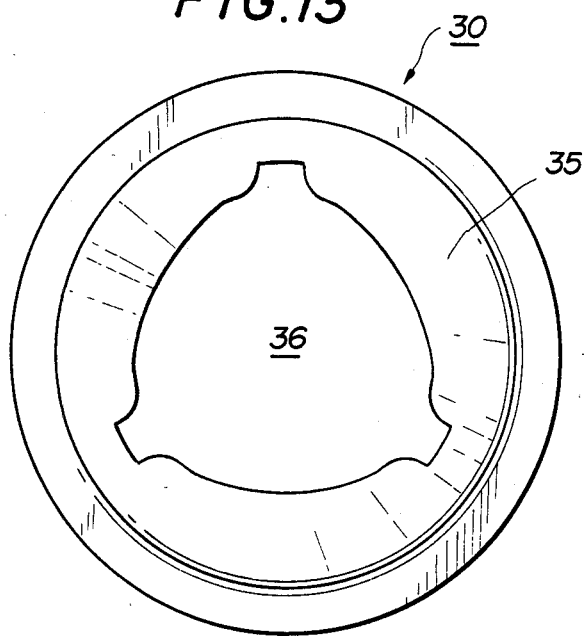
FIG. 13 is an end view of the end cover as viewed from the left side in FIG. 1.

As will be fully understood from the foregoing description, in the axial linear motion bearing in accordance with the present invention, the ball-turning grooves 23 are formed on the outer peripheral surface of the ball retainer 20 and the cooperating ball-turning grooves 31 are formed on the inner peripheral surface of the end cover 30, at the opposite portion of the ball retainer 20 and the end cover 30, each ball-turning grooves 23, 31 having depths substantially equal to one half of the ball diameter. Therefore, when the outer cylinder 10, ball retainer 20 and the end covers 30 are assembled with the balls charged in respective ball grooves, circular ball turning passages A having a substantially circular cross-section of a diameter approximating equal to that of the ball are formed by the ball turning grooves 23 and 31 of the ball retainer 20 and the end cover 30, as shown in FIGS. 5 and 6.

The assembly of this bearing can be done firstly by fitting the ball retainer 20 into the outer cylinder 10 with the multiplicity of balls charged in respective ball guide grooves, secondly fitting the pair of end covers 30, 30 to both end portions of the ball retainer 20 projecting from both ends of the outer cylinder 10, and finally welding the end covers 30 to the outer peripheral surfaces of the ball retainer 20 by a suitable apparatus such as a plastic welder.

In operation, the axial linear motion bearing having the described construction is mounted on the spline shaft 40 such as to embrace the latter. As the bearing is moved linearly in the axial direction of the spline shaft 40, the rolling balls of respective trains are recirculated through respective endless track grooves between the loaded region and the non-loaded region. In the intermediate region between the loaded region and non-loaded region, the rolling balls are smoothly guided along the constant track by respective circular ball-turning passages A each being constituted by the ball-turning grooves 23 and 31 of the ball retainer 20 and the end cover 30, in such a manner as to completely surround the rolling balls. Namely, the rolling balls running along each ball-turning passage A naturally makes a point contact with the center P (see FIGS. 5B to 5D) in the ball-turning groove 31 of the end cover 30 by the action of the centrifugal force, so that they can turn along a constant track path which is determined by the center P of the ball-turning groove 31. In consequence, the rolling balls are smoothly guided from the loaded region to the non-loaded region and vice versa, without causing any noise. In addition, in the axial linear motion bearing of the invention, the ball-turning passages which interconnect the loaded and non-loaded regions of the endless ball passages are formed in the end covers 30 which are made of a light-weight plastic material separately from the outer cylinder 10 which has a heavy weight. This in turn permits the length of the heavy outer cylinder 30 to be reduced, because the outer cylinder is required only to have the straight portions of the endless track grooves, i.e., need not have the circumferential grooves in its both axial end portions.

It is to be understood also that, since the assembly can be completed simply by fitting the end covers 30 to both end portions of the ball retainer projected beyond the ends of the outer cylinder 10 and welding the end covers to the outer peripheral surfaces of the ball retainer, the process is simplified and the production cost is lowered accordingly.

In addition, the end covers 30 and the ball retainer 20 can be formed easily from a plastic by injection molding, so that they can easily be mass-produced to contribute to the reduction in the production cost.

The dust cover 35 which is formed integrally with the end cover 30 has an inner configuration which substantially conforms with the outer configuration of the spline shaft 40, so that it effectively prevents dusts and other foreign matters from coming into the bearing.

For information, the spline shaft 40 which has a substantially regular triangular cross-section with three axial ridges 41 which protrude radially outwardly from the spline shaft 40. When the bearing is mounted on the spline shaft 40, each protrusion 41 is disposed in the space between two adjacent loaded ball trains 11, 11 within each loaded ball guide groove 13 formed in the outer cylinder 10. In consequence, the loaded balls are clamped between each side surface of the ridge 41 and the corresponding wall of the loaded ball guide groove 13, thus attaining an angular contact arrangement which transmits the torque between the outer cylinder 10 and the spline shaft 40 without fail.

Although the invention has been described through specific terms, it is to be noted that the described embodiment is only illustrative and various changes and modifications may be imparted thereto without departing from the scope of the invention which is limited solely by the appended claims.

What is claimed is:

1. A bearing for axial linear motion comprising:
 a substantially cylindrical outer cylinder having a plurality of loaded ball guide grooves and a plurality of non-loaded ball guide grooves formed on the inner peripheral surface thereof such that said loaded ball grooves and said non-loaded ball guide grooves are alternatingly formed in the circumferential direction;
 a substantially cylindrical ball retainer received on said outer cylinder and having an axial length greater than that of said outer cylinder and provided on the outer peripheral surface thereof with a plurality of endless track grooves which cooperate with said loaded and non-loaded ball guide grooves of the said outer cylinder so as to permit respective trains of a multiplicity of rolling balls to be recirculated therethrough; and
 a pair of substantially ring-shaped end covers fitted and welded to both axial end portions of said ball retainer projecting beyond both ends of said outer cylinder, each of said end cover being provided on the inner surface thereof with ball-turning grooves which radially confront the ball-turning grooves of said endless track grooves in said ball retainer so as to define circular ball-turning passages through which said rolling balls are moved from the loaded regions to the non-loaded regions of said endless track grooves and vice versa.

2. A bearing for axial linear motion according to claim 1, wherein said ball retainer and said end covers are made of a plastic and said end covers are welded at their inner peripheral surfaces to the outer peripheral surface of said ball retainer.

3. A bearing for axial linear motion according to claim 1, wherein each of said end covers is provided with a dust cover which projects radially inwardly from the end thereof remote from said outer cylinder.

* * * * *